United States Patent Office 3,553,070
Patented Jan. 5, 1971

3,553,070
OPEN SCRIM-LIKE NETWORK FOAM PRODUCT
Arnold F. Sparks, Holcomb, N.Y., assignor to Mobil Oil Corporation, a corporation of New York
No Drawing. Filed Mar. 21, 1968, Ser. No. 714,809
Int. Cl. B32b 5/20, 7/02
U.S. Cl. 161—160        6 Claims

ABSTRACT OF THE DISCLOSURE

The present invention relates to tubular thermoplastic film laminates comprising at least two layers of thermoplastic film, the exterior layer being characterized in that it is formed of foamed thermoplastic and the interior layer being characterized by being formed from non-foam thermoplastic. The novel laminar structures of the present invention are further characterized by having been formed by the continuous extrusion of the laminar structures through a single annular die orifice.

BACKGROUND OF THE INVENTION (I) Field of the invention

The present invention relates to novel thermoplastic tubular laminate material and particularly tubular laminates characterized by having an exterior surface thereof formed from a thermoplastic foam material. It has been found that such laminar structures are useful for example in the production of heavy-duty thermoplastic bags which exhibit improved skid resistance when they are stacked one on top of the other. Heretofore, great difficulty has been experienced in the stacking of filled thermoplastic heavy-duty bags which bags are, for example, utilized for containing grain, feed, cement and the like. It has been found that when such bags are stacked to sufficient heights to afford efficient storage and transport thereof, there is a tendency for such bags to slip relative to each other, which slippage causes severe handling problems. It has now been found that when heavy-duty bags are fabricated utilizing the novel tubular laminate structures of the present invention, slipping problems of this nature are either completely eliminated or substantially reduced. The novel laminar tubular products of the present invention have also been found to be useful in many other areas of application. For example, such laminates are effective when employed as backing material for flexible substrates such as insulation batting and the like. Such laminar film backing imparts increased rigidity to such materials whereby they may be more easily handled and affixed to materials it is desired to insulate.

(II) Description of the prior art

Numerous methods have been employed in the past to achieve satisfactory film-foam laminar structures such as, for example, the method disclosed in U.S. Pat. No. 3,325,332. This patent discloses a method of laminating plastic film to compatible plastic foam which comprises the steps of softening the foam through the application of heat prior to contact with the film preheating the film so that only its outer surface is softened prior to contact with the film and pressing the film and the foam together. Such a method is employed by the patentee to effect the lamination of relatively thick plastic webbing to relatively thicker foam billets for example. In addition to the control problems such a method presents, for example, temperature control and laminating pressure control, the resultant film-foam laminates themselves are quite susceptible to delamination when subjected to handling during the course of their intended use.

U.S. Pat. No. 3,178,832 discloses foam polyester resin laminated products and methods for the manufacture thereof. The laminated film-foam articles disclosed in this patent are formed by thermally welding preformed film to a preformed foam substrate utilizing a high frequency dielectric heat sealing device. As in the case of the patent discussed above which likewise employs a thermowelding technique to effect lamination of the film to the foam, such laminar structures are likewise susceptible to delamination during usage, such undesirable delamination characteristics generally resulting from the inherent deficiencies of the thermowelding techniques generally employed to produce such products.

SUMMARY OF THE INVENTION

In general, the present invention relates to multilayer laminates comprising a thin thermoplastic film, i.e. on the order of less than about 20 mils thickness, and preferably less than about 10 mils thickness laminated to a relatively thin layer of a foamed thermoplastic polymer, said foamed thermoplastic polymer layer being on the order of less than about 20 mils thickness and preferably less than about 10 mils thickness. Although the present invention contemplates fabrication of such film-foam tubular laminates from a wide variety of thermoplastic materials such as, for example, polyolefins, vinyls, polyamides, styrene, styrene copolymers, polyvinylidene chloride and some of the engineering plastics, for purposes of illustration the present disclosure is specifically directed to laminates which include tubular laminar structures comprising an inner layer of a lower mono-olefin and an outer layer of a foamed copolymer such as, for example, a foamed ethylene-vinyl acetate copolymer. Such laminar tubular film has been found useful in the fabrication of heavy-duty shipping sacks as hereinbefore discussed. When bags fabricated from such laminate constructions are filled with product and stacked one upon the other, they exhibit excellent skid or slip resistance. Conversely, it has been found that when laminar structures having an unfoamed ethylene-vinyl acetate copolymer outer layer are employed to fabricate, for example, bag structures, the outer unfoamed ethylene-vinyl acetate film layer, is initially tacky as a result of the inherently tacky nature of ethylene-vinyl acetate copolymer films. However, during subsequent storage and use of such bag structures, e.g. in the dusty atmosphere frequently encountered, for example, in fertilizer packing operations, the ethylene-vinyl acetate outer layer of the bags becomes contaminated with dust and foreign particles in the air which tend to cling to and coat the bag surface as a result of the high degree of tack exhibited by the ethylene-vinyl acetate film material. This dusting-over of the surface of the bag results in a complete loss, or at least a very substantial reduction in the "as-extruded" surface tack of the ethylene-vinyl acetate outer layer of the bag structure. Consequently, upon filling such bags and the subsequent stacking and palletizing of the loaded bags, it is found that such bags offer little or no resistance to skidding or sliding, whereby it is extremely difficult to maintain a number of such bags in stacked arrangement for purposes of transportation or storage.

In accordance with one aspect of the present invention, it has been found that by virtue of the foamed configuration of the ethylene-vinyl acetate copolymer outer layer of the present laminate products, even when such structures are exposed to contaminated atmospheres as aforediscussed, the anti-skid property of the film surface remains unimpaired. Although it is not desired to limit the scope of the present application to the mechanism by which such a phenomenon may occur, it has been theorized that as a result of the increased surface area which the foam layer provides on the outer bag surface due to the crater-like, open network of foam cells which comprise the exposed, exterior, foam layer surface, the dust and other foreign particle contaminants bridge the tiny craters of the foam surface of the layer rather than adhering to the total surface area of the ethylene-vinyl acetate layer, as in the case of the non-foamed ethylene-vinyl acetate outer layer structure discussed above. Thus, the laminar products of the present invention offer a highly improved skid resistant surface, especially in those instances where the film products are exposed to dust contaminated atmospheres.

In addition to utility as a material for forming bag structures characterized by having a non-skid surface, the flexible film products of the present invention have been found to be extremely suitable in a myriad of other end use applications. For example, the laminar products of the present invention have been found to be useful as support backing materials for items such as commodities which are quite difficult to handle in the absence of some type of support backing. Specifically, for example, as support backing sheets for fibrous insulation batting, such as spun fiberglass insulation batting. It has been found that when the composite laminar film structures of the present invention comprising, for example, a supporting layer of unfoamed material, e.g. a lower mono-olefin, such as polyethylene, polypropylene or polybutene-1, is laminated to a copolymer such as foamed ethylene-vinyl acetate, such a laminar construction may be heat welded to the fibrous insulation batting, the foam ethylene-vinyl acetate surface layer providing an excellent, low melt-temperature, thermal adhesion surface.

Other end use applications for the flexible film-foam composite laminates of the present invention include materials such as decorative films. It has been found that when various pigments are added to the respective laminar layers prior to the extrusion thereof, employing various blending techniques which are well known in the art, unusual color effects may be obtained. Such colored laminar film products are useful as overwrap materials, table cloths, book covers, draperies, upholstery, and the like. Additionally, it has been found that the relatively thin exterior foam layer of the flexible film laminates of the present invention retard the formation of condensed water droplets when, for example, such laminar films are employed as bags or overwrap for containing cold or frozen food commodities.

Although a variety of methods may be employed to produce the film-foam laminates of the present invention, coextrusion of the respective laminar layers, in a molten state, through a single die outlet orifice has been found to be an especially desirable method. Such a technique allows for the formation of the relatively thin gauge, i.e. on the order of less than about 10 mils, foam layer to be applied to the support, non-foam, film layer in a single stage, extrusion step. U.S.P. No. 3,337,914 discloses an apparatus and method which have been found suitable for the production of the novel, laminated film products of the present invention. As this patent specification discloses, a plurality of layers of diverse plastic materials may be extruded employing a plurality of extruders, each of which feeds molten plastic to a single composite die structure formed of a plurality of stacked decks of any desired number (depending solely on the number of laminar layers desired in the extruded laminate), whereby the stacked decks define respective outlet orifices between adjacent decks so that a die can be stacked as high as desired for any desired number of extruded layers. As illustrated, in FIG. 2 of the patent drawings, there is shown an apparatus useful for forming three layer laminates. For use in making the two layer film-foam laminates discussed above and hereinafter, such an apparatus is made adaptable by not using one of the extruders and its associated tubular die element.

The composite tubular die comprises a series of superposed tubular die members, each of the tubular die members being separately fed by one of the aforementioned extruder elements. Each of the superposed tubular die members are secured, one on top of the other, in adjacent contacting relationship, and each of the tubular die members has a concentrically located mandrel element located at the center of each die, along which mandrel molten thermoplastic layer (or layers) flow. The thermoplastic material is fed from a standard screw type extruder into the lowermost die member. The thermoplastic material from the lowermost die member proceeds upwardly into the second tubular die member where it is joined, around the outside thereof, by molten thermoplastic material which is supplied by a second extruder to said second tubular die member. Subsequently, the two layers of molten tubular material are expressed through a single tubular die orifice whereupon the extruded laminar tube is blown utilizing internal air pressure (a standard extrusion technique). Thereupon, the tube, after being cooled and solidified, is collapsed and subsequently passed through a bag-making operation or to a wind-up station. It will be understood that such a method is not limited to the extrusion of a particular number of molten thermoplastic layers, but may be employed for as few as two layers or, conversely, as many as five or more depending upon the number of tubular die members, and associated extruders, employed in the process to form the composite tubular laminar structure. In the utilization of such an extrusion technique, the lamination of the respective molten layers of thermoplastic material occurs interiorly of the die, i.e. before the laminated structure is extruded through the tubular outlet orifice. The lamination is effected in the absence of any special adhesive materials or any other bonding techniques.

When making the laminar structures of the present invention comprising at least one layer of a foam thermoplastic, e.g., the aforedescribed specific products comprising a layer of foam EVA, and a support layer of a lower mono-olefin, the EVA copolymer foam layer is formed by uniformly coating EVA copolymer resin particles, prior to the introduction thereof into the extruder feed hopper, with a blowing agent such as, for example, azodicarbonamide or azobisformamide, utilizing approximately 2% by weight of amide based upon the total weight of copolymer charged to the feed hopper. The copolymer resin, coated with the blowing agent, is subsequently fed into a standard extruder wherein a molten mass is formed and subsequently passed into one of the component die members of the composite die structure aforediscussed. The temperatures within the extruder and/or die elements are such that the amide blowing agent will decompose liberating nitrogen which in turn causes a foaming action whereby EVA copolymer foam is extruded as one of the laminar layers, in intimate contact with a non-foamed supporting layer through the single outlet orifice of the composite die.

In accord with one aspect of the novel film-foam laminar structures of the present invention, it has been found that the thickness of the component layers comprising the laminates may vary within wide limits, providing, however, that the respective layer thicknesses are not in excess of about 10 mils as aforediscussed. Thickness variations have been found to have a marked effect on the appearance of the outer foam layer. For example, very thin outer foam layers, e.g. on the order of from about 0.5 mil to about 1.0 mils exhibit a surface appearance very similar to an open, scrimlike, network of foam material, the non-foamed thermoplastic support layer being exposed through the random crater-like openings, in the thin, non-continuous network of foam. Additionally, it has been found that when the outer foam layer is applied to the non-foamed thermoplastic support layer to form a substantially thicker gauge outer foam layer (e.g. on the order of from about 1.5 mils to about 10 mils) the foam is characterized by being a continuous layer, completely covering, with no network of crater-like openings, the non-foamed thermoplastic support layer.

In a still further embodiment of the film-foam laminar structures of the present invention, continuous tubular laminates have been produced wherein the outer foam layer of the laminate comprises a longitudinal stripe or series of parallel stripes spaced around the periphery of the non-foamed thermoplastic support surface. When such tubular laminar materials are formed into bag structures, for example, it has been found that such bags offer improved resistance to skidding when arranged in stacks. Thus, surface skid-resistance may be quite economically imparted to bag structures by employing reduced amounts of foamable plastic to form the outer foam layer. Additionally, in instances where the non-foamed support thermoplastic is a clear, transparent material (i.e. non-pigmented, for example) the clear, non-laminar, transparent areas of the support film, intermediate the longitudinally extending foam stripe or stripes, allows for visual identification of the bag contents.

DESCRIPTION OF SPECIFIC EMBODIMENTS

Example 1

A flexible laminated thermoplastic tube comprising an outer layer of foamed thermoplastic and an inner layer of a nonfoamed support thermoplastic layer was made by the continuous extrusion thereof utilizing the apparatus and method disclosed in U.S.P. No. 3,337,914. The outer laminar layer of foam was formed from a commercially available ethylene-vinyl acetate copolymer resin containing approximately 18 to 20% by weight of vinyl acetate and about 80 to 82% by weight of ethylene. The copolymer had a melt index of about 2.0 and a density of about 0.943 gm./cc. The inner support layer was formed from a commercially available low density polyethylene resin having a melt index of about 0.25 and a density of about 0.917 g./cc. The overall thickness of the laminate structure was approximately 9 mils, the foam ethylene-vinyl acetate outer layer being approximately 4 mils thick and the inner polyethylene support layer being approximately 5 mils thick. The foam ethylene-vinyl acetate outer layer contributed about 20% by weight to the total weight of the laminate structure. This laminate tube structure was subsequently formed into a bag structure which, as aforediscussed, exhibited excellent skid resistance when a number of such bags were arranged in stacked alignment.

Example 2

A flexible laminated thermoplastic tube comprising an outer layer of foamed thermoplastic and an inner layer of a nonfoamed support thermoplastic layer was made by the continuous extrusion thereof utilizing the apparatus and method disclosed in U.S.P. No. 3,337,914. The outer laminar layer of foam was formed from an ethylene-vinyl acetate copolymer resin identical to the copolymer resin described in preceding Example 1. The inner support layer was formed from a commercially available polybutene resin having a melt index of about 0.7 and a density of about 0.912 g./cc. The overall thickness of the laminate structure was approximately 6 mils, the foam ethylene-vinyl acetate layer being approximately 3 mils thick and the inner polybutene layer being approximately 3 mils thick. The foam ethylene-vinyl acetate outer layer contributed about 25% by weight to the total weight of the laminate structure. The laminate tube structure was subsequently slit to form a flat backing sheet which was thermally welded to a non-woven layer of fibrous spun glass insulation batting, the ethylene-vinyl acetate foam layer being in contact with the batting and the polybutene side of the laminate being remote therefrom.

Although the present invention has been described with specific embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A laminar flexible film structure which comprises at least two thermoplastic film layers intimately adhered together (a) one of said film layers being a support layer, said support layer comprising a non-foamed, flexible, continuous thermoplastic layer, and (b) a second layer, said second layer comprising a flexible, thermoplastic foam layer, said foam layer comprising an open, scrim-like network of foam material, said non-foamed layer being exposed through random, crater-like openings in said network of foam material.

2. The laminar flexible film structure as defined in claim 1 wherein said foam layer is non-coextensive with said support layer.

3. The laminar flexible film structure as defined in claim 1 wherein the total thickness of said flexible laminar structure is less than about 10 mils.

4. The laminar flexible film structure as defined in claim 1 wherein said support layer is at least about 0.5 mil and less than about 10 mils thick.

5. The laminar flexible film structure as defined in claim 1 wherein the said foam layer is at least about 0.5 mil and less than about 10 mils thick.

6. The laminar film structure as defined in claim 1 wherein said support layer comprises a member selected from the group consisting of polyethylene, polypropylene and polybutene and said foam layer comprises an ethylene-vinyl acetate copolymer foam.

References Cited

UNITED STATES PATENTS 3,159,698 12/1964 Suh et al. _____ 161—160
3,223,761 12/1965 Raley _____ 264—171

WILLIAM J. VAN BALEN, Primary Examiner